US008060248B1

(12) United States Patent
Boyer et al.

(10) Patent No.: US 8,060,248 B1
(45) Date of Patent: Nov. 15, 2011

(54) ROBOTIC ARM AND METHOD FOR USING WITH AN AUTOMATIC PHARMACEUTICAL DISPENSER

(75) Inventors: Joseph H. Boyer, Johnson City, NY (US); James G. McGonigal, Binghamton, NY (US); Bruce Edward Holtje, Berkshire, NY (US); Timothy William Limer, Vestal, NY (US); James Patrick Boyer, Endicott, NY (US); Mark Andrew Fisher, Apalachin, NY (US); Todd Edward Bower, Endicott, NY (US); Michael J. Hostetler, Vestal, NY (US)

(73) Assignee: Innovation Associates, Inc., Johnson City, NY (US)

( * ) Notice: Subject to any disclaimer, the term of this patent is extended or adjusted under 35 U.S.C. 154(b) by 1197 days.

(21) Appl. No.: 11/325,982

(22) Filed: Jan. 5, 2006

Related U.S. Application Data

(63) Continuation-in-part of application No. 10/105,570, filed on Mar. 26, 2002, now abandoned.

(51) Int. Cl.
*G06F 17/00* (2006.01)

(52) U.S. Cl. ........ 700/241; 700/231; 700/240; 700/242; 700/243; 700/235

(58) Field of Classification Search .......... 700/231–244; 221/1–312 C
See application file for complete search history.

(56) References Cited

U.S. PATENT DOCUMENTS 4,846,619 A * 7/1989 Crabtree et al. .............. 414/273
5,812,410 A 9/1998 Lion et al.
5,838,575 A 11/1998 Lion
5,884,806 A 3/1999 Boyer et al.
5,907,493 A * 5/1999 Boyer et al. .................. 700/231
6,006,946 A * 12/1999 Williams et al. .................. 221/9
6,036,812 A 3/2000 Williams et al.
6,176,392 B1 1/2001 William et al.
6,202,923 B1 3/2001 Boyer et al.
6,256,967 B1 7/2001 Hebron et al.
6,421,584 B1 * 7/2002 Norberg et al. ............... 700/242
RE37,829 E * 9/2002 Charhut et al. ............... 700/216
6,644,504 B2 * 11/2003 Yuyama et al. ............... 221/265
7,228,198 B2 * 6/2007 Vollm et al. .................. 700/235

OTHER PUBLICATIONS

U.S. Appl. No. 10/105,570.

* cited by examiner

*Primary Examiner* — Michael K Collins
(74) *Attorney, Agent, or Firm* — Mark Levy; Hinman, Howard & Kattell; David L. Banner

(57) ABSTRACT

There is provided an automated prescription filling system using a robotic arm in combination with an automatic pharmaceutical dispenser having a plurality of individual pill-counting units, each under the control of its own microprocessor. The automatic pharmaceutical dispensers are modified for use with the robotic arm. Because tablet counting is completely independent of the robotic arm, system throughput is higher than in systems of the prior art. Unlike systems of the prior art, each individual pill-counting unit can be removed from behind the pharmaceutical dispenser so that the system need not be stopped for such service. The fact that counting operations are divorced from robotic arm movements allows the arm movements to be optimized and multiple prescriptions to be processed simultaneously. Controller software optimizes movement of the robotic arm based upon such factors as the fullness of the vial being transported.

16 Claims, 8 Drawing Sheets

ROBOTIC ARM AND METHOD FOR USING WITH AN AUTOMATIC PHARMACEUTICAL DISPENSER

RELATED APPLICATIONS

The present invention is a Continuation-in-Part of application Ser. No. 10/105,570, filed Mar. 26, 2002 now abandoned for ROBOTIC ARM AND METHOD FOR USING WITH AN AUTOMATIC PHARMACEUTICAL DISPENSER, and is related to U.S. Pat. Nos. 5,884,806, for DEVICE THAT COUNTS AND DISPENSES PILLS, issued Mar. 23, 1999; 5,907,493, for PHARMACEUTICAL DISPENSING SYSTEM, issued May 25, 1999; and 6,202,923 for AUTOMATED PHARMACY, issued Mar. 20, 2001, all of which are hereby included by reference.

FIELD OF THE INVENTION

This invention relates to pharmaceutical dispensers and, more particularity, to a robotic arm for use in cooperation with an automated pharmaceutical dispensing system.

BACKGROUND OF INVENTION

Automated pharmaceutical dispensing systems are available which automatically count a predetermined number of pills, tablets, capsules, or similar items. The term pill is used hereinafter to designate any pill, tablet, capsule, or similar solid form of pharmaceutical or similar item. It will be recognized that while a pharmacy has been chosen for purposes of disclosure, the inventive system may be applied to many other fields and the invention is not considered limited to the environment chosen for purposes of disclosure. Such systems are disclosed in U.S. Pat. Nos. 5,884,806; 5,907,493; and 6,202,923, all commonly assigned to the assignee of the instant application. In these systems, pills are counted from a reservoir into an output buffer upon command. Once the pills have been counted, an operator empties the buffer contents into a vial or similar container.

It is also known in the art to use robotic arms to automate portions of the prescription filling process in an automated pharmacy. U.S. Pat. Nos. 5,812,410, for SYSTEM FOR DISPENSING DRUGS, issued Sep. 22, 1998 to Nicholas Lion, et al, and 5,838,575, for SYSTEM FOR DISPENSING DRUGS, issued Nov. 17, 1998 to Nicholas Lion, both teach a system wherein disposable containers of drugs are mounted vertically in a frame above individual counting units (i.e., base port subunits). Vials may be moved directly under the counting units to receive tablets or capsules counted from the disposable container. However, there is no teaching of a robotic arm or other robotic type manipulator. In some embodiments, vials to receive the pills, tablets or capsules are manufactured within or near the dispensing unit.

In contradistinction, the system of the present invention utilizes a robotic arm in combination with a multi-unit, automated pill dispensing unit. Pill counting is performed by individual independently operable pill counting units, each under direct control of an internal microprocessor. This allows pill-counting operations to be performed independently from movements of the robotic arm. While tablets are being counted, the robotic arm may be performing other tasks, such as fetching a labeled vial, moving an unlabeled vial to a labeling station, moving a filled vial from another counting unit to an output station, etc. In addition, no facility for manufacturing vials from plastic sheeting is provided.

U.S. Pat. Nos. 6,006,946 and 6,036,812 for PILL DISPENSING SYSTEM were both issued to Jeffery P. Williams, et al, on Dec. 28, 1999 and Mar. 14, 2000, respectively. Both of these patents teach using a robotic actuator for removing cassettes from a shelving unit, transferring the cassettes to a counting station, counting a predetermined number of tablets or capsules from the cassette into a vial, and ultimately returning the cassette to its proper place in the shelving unit and moving the filled vial to an output station.

The unit of the present invention, on the other hand, utilizes a robotic arm in combination with a sophisticated automatic pharmaceutical dispensing system wherein tablets or capsules are independently and simultaneously counted in each of the plurality of counting units in the dispensing system. This requires far fewer movements of the robotic arm and thus provides far greater throughput of the system because of the independence of the tablet counting operations from the robotic arm movement. In addition, parallel pill counting operations are possible, further improving system throughput. In the inventive system, no cassettes need be moved from a shelving unit to a counting unit.

U.S. Pat. No. 6,176,392 for PILL DISPENSING SYSTEM, issued Jan. 23, 2001 to Jeffery P. Williams, et al, teaches a bottle dispensing system for use in cooperation with the pill dispensing system disclosed in the '812 and '946 WILLIAMS patents described hereinabove.

The system of the present invention has no provision for dispensing bottles.

U.S. Pat. No. 6,256,967 for INTEGRATED AUTOMATED DRUG DISPENSER METHOD AND APPARATUS, issued Jul. 10, 2001 to Terrance J. Hebron, et al, teaches a system wherein at least one line of machines is provided to fill, label and cap vials of medication for a particular patient. Multiple prescriptions for a patient are grouped and accumulated in unique, patient-specific output bins.

The automated system of the present invention provides no facility for grouping various prescriptions for a particular patient, but rather fills each prescription independently. Only after the prescriptions have been inspected are they sent to a packaging area where multiple prescriptions for a single patient are identified and grouped for pickup by the patient.

None of these patents, either individually or in combination, anticipates or suggests the automated prescription filling system of the present invention.

It is therefore an object of the invention to provide a system using a robotic arm in combination with an automatic pharmaceutical dispenser.

It is a further object of the invention to provide a system using a robotic arm in combination with an automatic pharmaceutical dispenser having a plurality of individual, independent, pill-counting units.

It is another object of the invention to provide a system using a robotic arm in combination with an automatic pharmaceutical dispenser wherein each individual pill-counting unit has a dedicated microprocessor.

It is an additional object of the invention to provide a system using a robotic arm in combination with an automatic pharmaceutical dispenser wherein tablet or capsule counting is performed independently of and simultaneously with the movement of the robotic arm.

It is a still further object of the invention to provide a system using a robotic arm in combination with an automatic pharmaceutical dispenser wherein an individual pill-counting unit may be serviced from behind the automatic pharmaceutical dispenser so that normal operation of the robotic arm with other dispensing modules can continue normally.

It is an additional object of the invention to provide a system using a robotic arm in combination with an automatic pharmaceutical dispenser wherein replenishment of individual pill-counting units may be performed from behind the automatic pharmaceutical dispenser so that normal operation of the robotic arm with other dispensing modules can continue normally.

SUMMARY OF THE INVENTION

The present invention provides a robotic arm in combination with one or more automatic pharmaceutical dispensers having a plurality of individual pill-counting units, each under the control of its own microprocessor. Because pill counting is completely independent of the robotic arm, and multiple pill count units may count simultaneously, system throughput is higher than in systems of the prior art. Unlike systems of the prior art, each individual pill-counting unit can be removed from behind the pharmaceutical dispenser so that the system need not be stopped for such service. That is, operation of the robotic arm is not blocked by a technician in front of the dispensing unit. Also, tablets are loaded into the counting units from the rear of the dispenser. The fact that counting operations are divorced from robotic arm movements allows the arm movements to be optimized; multiple prescriptions may be processed simultaneously.

BRIEF DESCRIPTION OF THE DRAWINGS

A complete understanding of the present invention may be obtained by reference to the accompanying drawings, when taken in conjunction with the detail description thereof and in which.

DESCRIPTION OF THE PREFERRED EMBODIMENT

Figure 1:
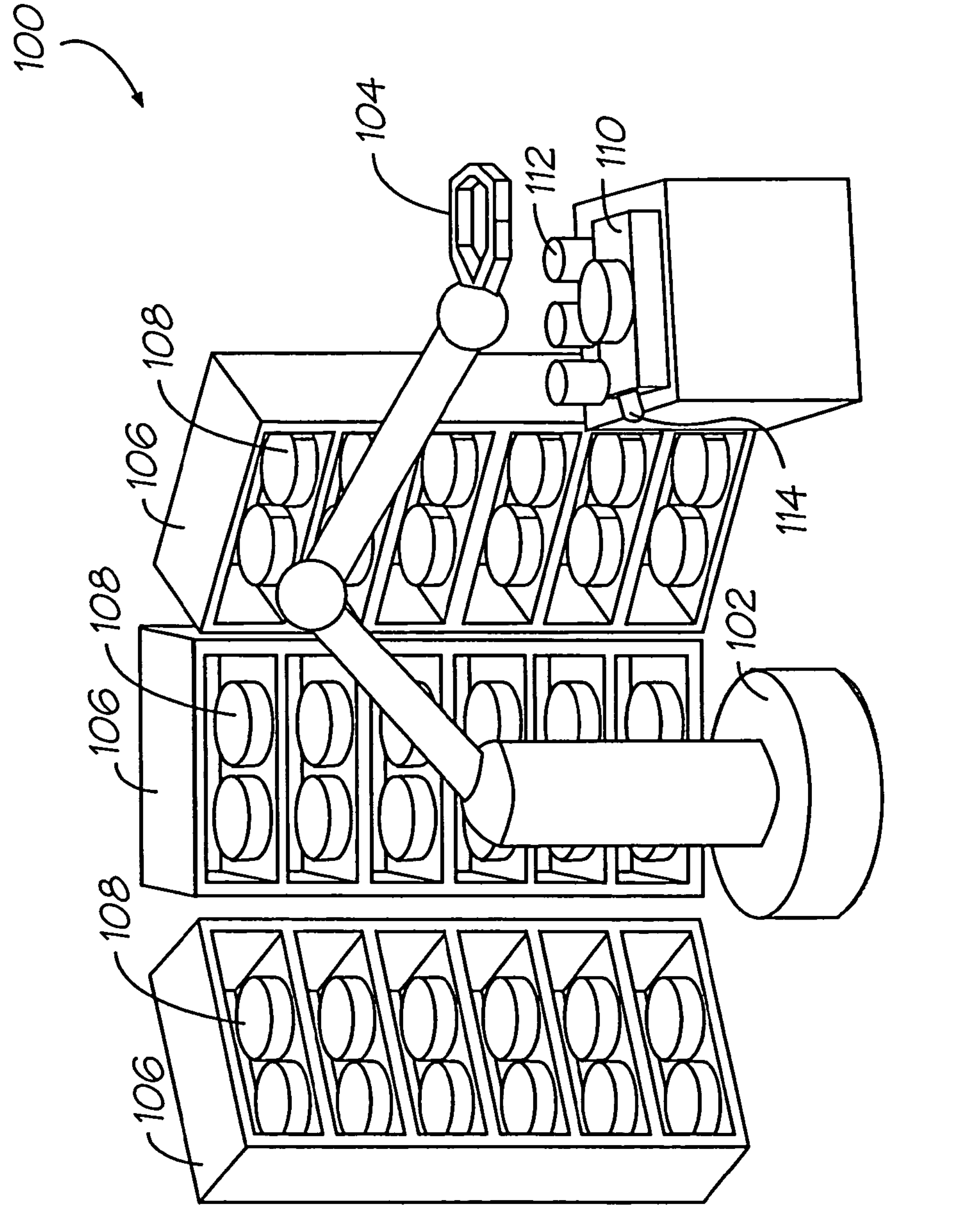
Prior Art Figure 1
FIG. 1 is a perspective, schematic view of a first robotic arm implementation of the prior art.

Referring first to FIG. 1, there is shown a perspective, schematic view 100 of a robotic arm 102 used in an automated prescription filling system of the prior art. Robotic arm 102 is equipped with an end effector 104 as is well known in the robotics art. While a robotic arm 102 having an effector 104 is shown for purposes of disclosure, it will be recognized that other suitable robotic mechanisms may be used to accomplish the disclosed vial movement tasks in accordance with the invention. Consequently, the invention is not limited to the robotic arm chosen for purposes of disclosure but covers any robotic mechanism suitable for accomplishing the described vial movement tasks. For simplicity, the term robotic arm is used herein to refer to any such robotic mechanism.

A series of shelving units 106 hold cassettes 108 filled with prescription drugs, generally in pill, tablet or capsule form. Each cassette 108 is specifically designed for the type (i.e., the physical form factor) of drug to be dispensed.

Under computer control, as discussed in detail hereinbelow, robotic arm 102 moves to a particular cassette 108 on shelves 106, grasps the cassette 108, and moves the cassette 108 to a pill counter 110. Robotic arm 102 then deposits cassette 108 on counter 110. At any time after the arrival of cassette 108 at counter 110, tablet counting may commence, the counted tablets being placed in a buffer (not shown).

While counting is in process, robotic arm 102 moves to a vial storage location (not shown), grasps a vial 112 and proceeds to a labeling station (not shown). At the labeling station, vial 112 is labeled, either manually or by an automated labeling system as is well known in the pharmacy automation art.

Robotic arm 102 then moves vial 112 to a position under discharge chute 114 of pill counter 110. Once vial 112 is in position, the counted tablets or capsules are released from a buffer (not shown) within counter 110. Robotic arm 102 then moves filled vial 112 to an output area and places filled vial 112 on an output conveyor (not shown). After depositing filled vial 112 onto the conveyor, robotic arm 102 retrieves cassette 108 from counter 110 and replaces it in its original position on shelves 106. The robotic arm 102 is then ready to fill the next prescription.

Figure 2:
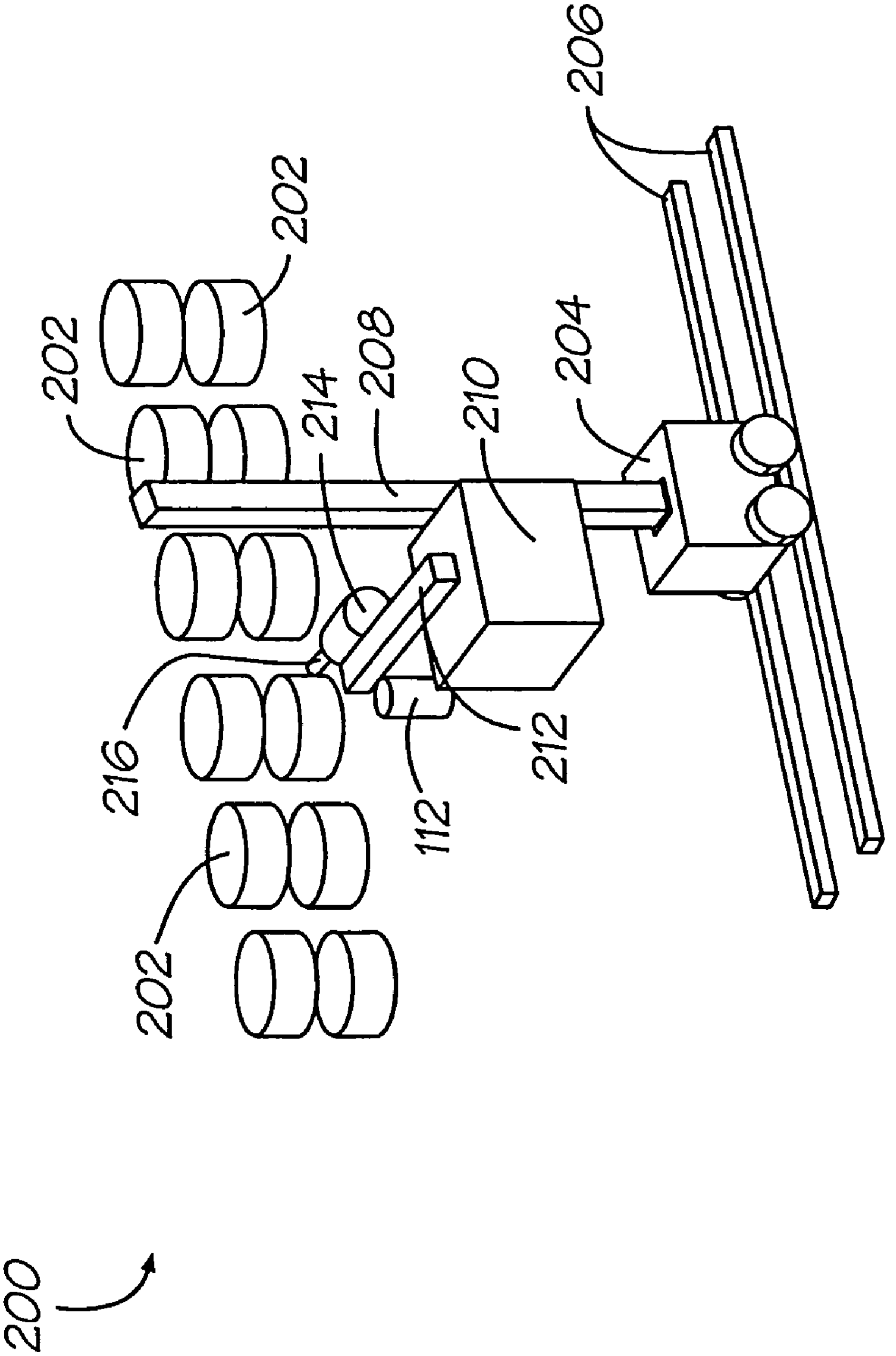
Prior Art Figure 2
FIG. 2 is a perspective, schematic view of a second embodiment of a robotic arm implementation of the prior art.

Referring now to FIG. 2, there is shown a perspective, schematic view 200 of an alternate embodiment of a robotic system used in an automated prescription filling system of the prior art. Pharmaceuticals to be dispensed are stored in a rectangular array of cassette mechanisms 202. A gantry mechanism 204 rides on tracks 206 disposed adjacent to the array of cassette mechanisms 202. Gantry 204 allows horizontal movement along the array of cassette mechanisms 202.

A vertical post 208 is mounted on gantry 204. Mechanism 210 is supported on post 208 and may travel therealong. On mechanism 210 is a horizontal member 212 which is movable towards and away from the array of cassette mechanisms 202. In effect, the combination of gantry 204, mechanism 210 moving on post 208, and horizontal member 212 allows movement along the X, Y and Z axes.

Horizontal member 212 is adapted to grasp a vial 112 from a vial storage area and move it into proximity to a selected cassette mechanism 202. Once vial 112 is in its proper position, a motor 214 having a shaft 216 which is received in cassette mechanism 202, rotates and dispenses a predetermined number of tablets or capsules from cassette assembly 202 directly into vial 112. Vial labeling may be performed either before or after vial filling. Once the filled vial 112 is labeled, it is placed on an output conveyor (not shown) and the robot assembly 200 is available to fill the next prescription. Prior art systems like that shown in FIG. 2 are generally faster than those shown in FIG. 1.

A pharmacist inspects the vials on the output conveyor and ensures that the correct pharmaceutical has been dispensed. Once satisfied, the pharmacist places a cap on the vial 112, mates the vial 112 with the correct paperwork (typically a copy of the label that was applied to the vial 112, as well as other data in the prescription data record and/or patient instructions) and allows the filled, capped vial 112 to proceed to a shipping or other delivery station (not shown). Both types of systems suffer from the fact that the robotic arm is occupied for the entire period that tablets or capsules are being counted.

Figure 3:
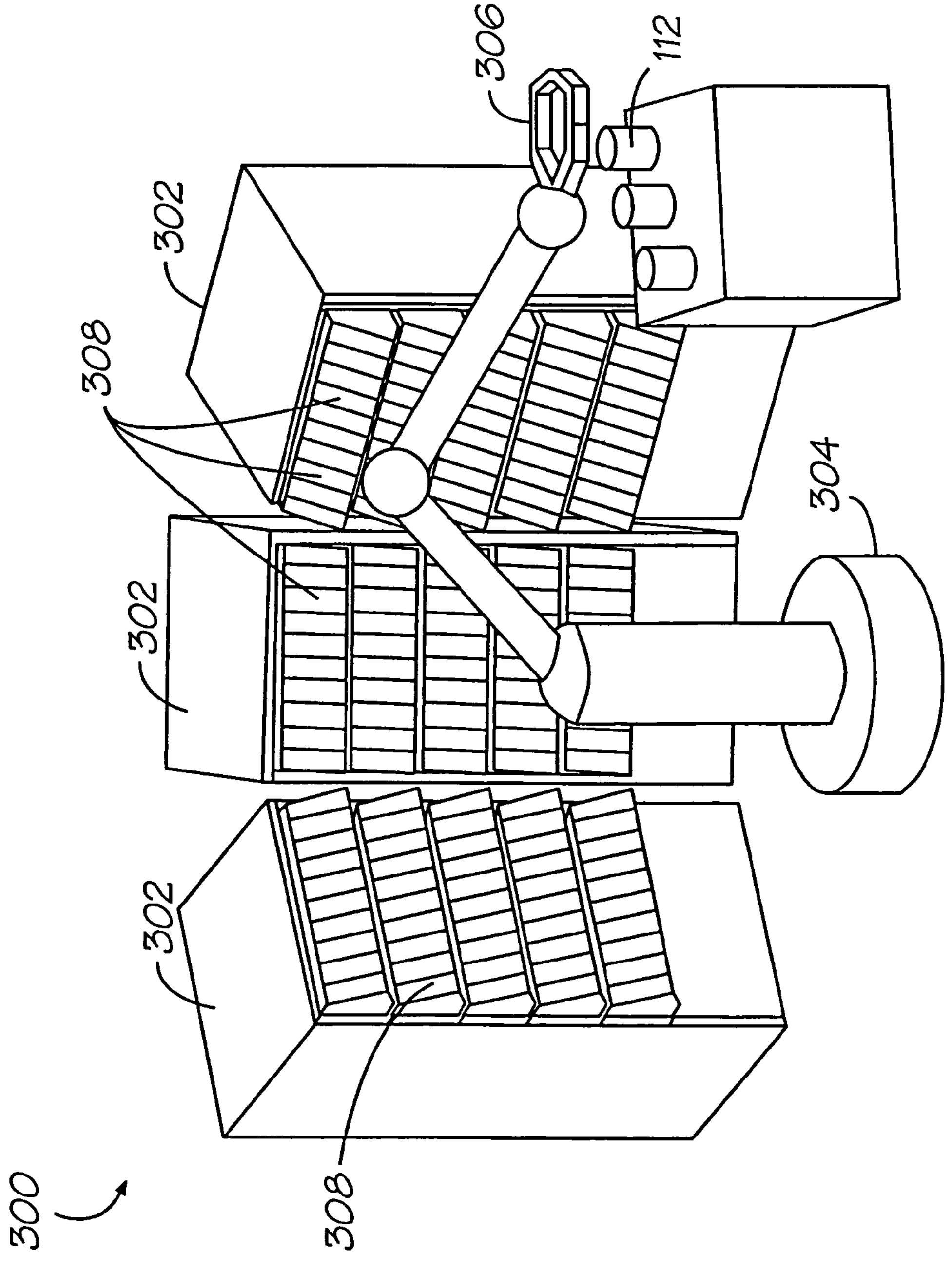
FIG. 3 is a perspective, schematic view of the robotic arm implementation of the invention.

Referring now to FIG. 3, there is shown a perspective, schematic view 300 of a robotic arm in accordance with the invention for use with an automated tablet dispensing system. Automated dispensing systems 302 such as those described in U.S. Pat. No. 5,907,493, are well suited for use with an auxiliary robotic arm. Each dispensing system 302 contains an array of dispensing modules (i.e., pill counters) 308. Such dispensing modules 308 are described in detail in U.S. Pat. No. 5,884,806.

Refer now also to FIGS. 5*a*-5*d*. Dispensing modules 308 each have an operator interface that requires the user, not shown, to bring an empty, typically pre-labeled vial 112 to the appropriate dispenser 308 and press release switch actuator 504. The part of the dispenser 308 that accepts the vial 112 is the vial adapter 500. This vial adapter 500 has a V-shaped backstop 502 to assist the user in locating the vial 112 against the switch actuator 504 that is located at the apex of the V-shaped backstop. After the switch, not shown, is activated by switch activator 504, the hopper door, not shown, opens and the contents of the internal buffer, (i.e., the pre-counted tablets), are released into the vial 112. This human-user interface has one key aspect that is rarely mentioned and is intuitive in nature. When the operator holds the vial 112 in position, it is natural to push the vial into the V notch of the vial adapter, and press the vial in place with a force that is greater than is required to actuate the switch. The switch typically requires only about 300 grams force to actuate. The excess force exerted by a human operator is important when considering differences between a human operator and a robot.

A robotic manipulator 304 equipped with an end effector 306 to hold a vial 112 at the correct angle and position in front of a dispenser 308 is programmed to a position in three-dimensional space. Position alone is the defining goal of the robotic manipulator. For example, there is no feedback mechanism present that indicates to a controller that the vial 112 is seated against backstop 502 of vial adapter 500. It should be noted that the actuation of the dispenser release switch described hereinbelow does not typically provide vial location information of high enough accuracy to precisely position vial 112.

The robotic manipulator 304 is programmed to a location that includes the pressing of the dispenser release switch, not shown, via switch actuator 504. However, all such simple switches experience both over-travel and hysteresis. Over-travel is the distance the switch actuator 504 moves beyond the point where the switch makes electrical connection. This over-travel of the switch actuator 504 is typically about 0.030 to 0.060 inches. When a human operator presents vial 112 at the dispenser 308, this over-travel is small enough, and so subtle, that most people do not feel or recognize its existence. However, the over-travel is necessary for the complete engagement and alignment of the vial 112 to the opening 506 to the internal buffer, not shown. The over-travel is always achieved when excess force is applied to the vial 112. The robotic manipulator, however, is programmed to a position that actuates the switch, but is not necessarily the full stroke of the switch/switch-actuator 504 (including all the over-travel). This difference is significant. In addition, variations in vials 112, (e.g., vials may be purchased from different manufacturers, or vial size may vary slightly even in vials from the same manufacturer), or operational tolerances in the movement of the robotic arm 304 may exacerbate the problem.

Switch hysteresis also becomes important as the dynamics of the settling manipulator can result in a momentary overshoot of the target position, which will actuate the switch but the manipulator may restore to a position further away than anticipated, while the switch remains actuated.

These combined effects mean that there can be upwards to a 0.090-inch difference between the actual vial 112 position and the fully seated vial position in the V-shaped backstop 502 of the vial adapter 500. This distance from the fully seated position is sufficient for small tablets like Zocor®, Synthroid®, and Estradiol® to rest edgewise on the lip of the vial 112 during the buffer release. When the robotic manipulator 304 moves the vial 112 away from the dispenser, such tiny tablets usually fall to the floor.

While the percentage of tablets which fall edgewise onto a vial, then fall to the floor, is small, when hundreds of thousands of tablets are handled daily in a refill center, the total number is unacceptable. A lost tablet means that the prescription being filled is short one tablet.

One solution to the problem of lost tablets is to funnel or guide the dropping tablets outward into the vial 112. The round vial adapter opening, 506 (typically about 1.3 inches in diameter) is chosen to minimize any form of constriction to prevent bridging of tablets during release from the output buffer. However, a compromise is necessary whereby some constriction is necessary to divert the tablets released from the output buffer further towards the center of the vial 112. The first prototypes were a shim or wedge 508 added to the vial adapter 500' (FIGS. 5*c* and 5*d*). This glued-in piece was tapered to a thin knife-edge on the upper edge of the wedge 508 to eliminate any chance that a tablet could catch or hang at that point. From the top edge, the wedge 508 enlarged to a maximum of approximately 0.115 inch at the midpoint. Because this wedge fits into a round opening 506, the wedge 508 tapers to zero thickness towards each side.

After the contour of the shim or wedge 508 was optimized, several hundred dispensers 308 were modified with the glued in parts. The performance of the system showed a marked improvement (i.e., dropped tablets were significantly reduced) with robotically presented vials 112. The measured performance was about a ten-fold decrease, to about 0.005% drops.

With the success of the initial tests, the mold for the vial adapter 500' was modified to include this feature.

Figure 5A:
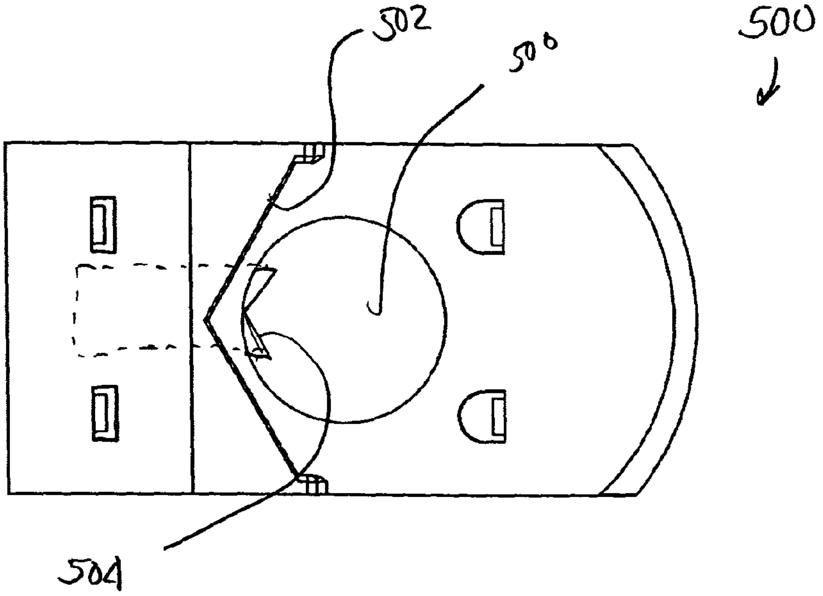
FIGS. 5*a* and 5*b* are bottom plan and side sectional isometric views, respectively of a vial adapter for use for use in human vial presentation in an automated prescription dispensing system.
Figure 5B:
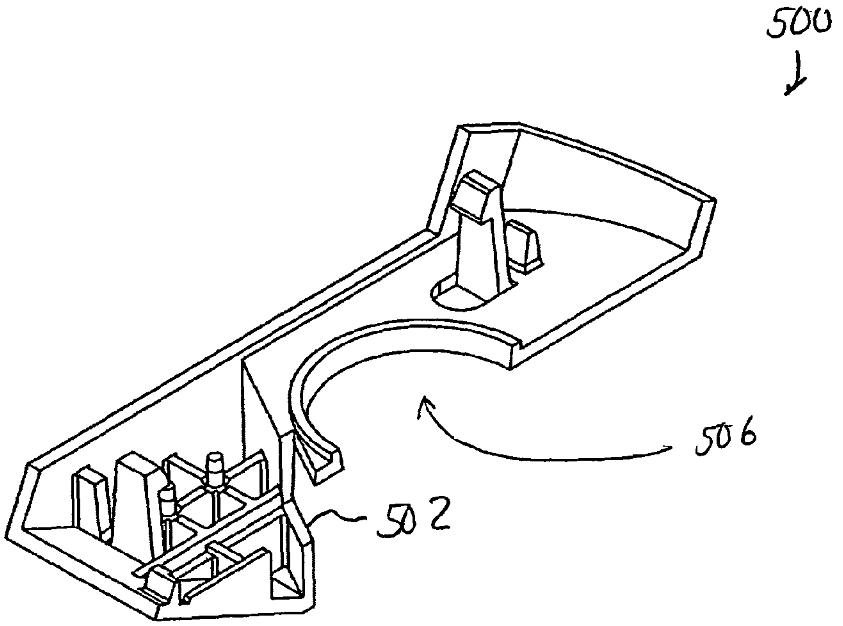
Figure 5C:
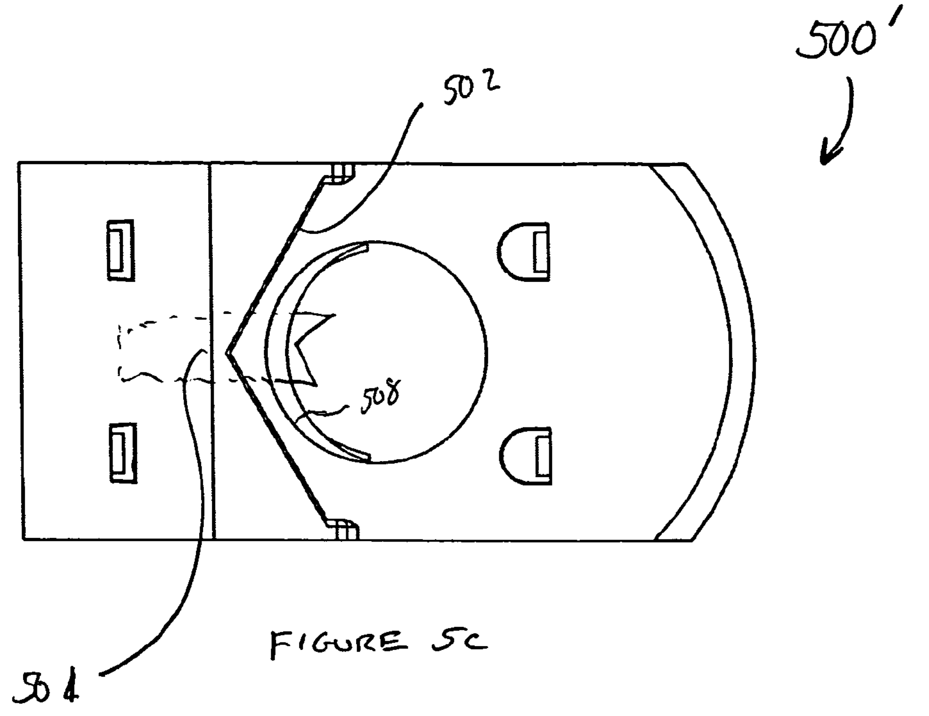
FIGS. 5*c* and 5*d* are bottom plan and side sectional isometric views, respectively of a vial adapter for use for use in robotic presentation in an automated prescription dispensing system.
Figure 5D:
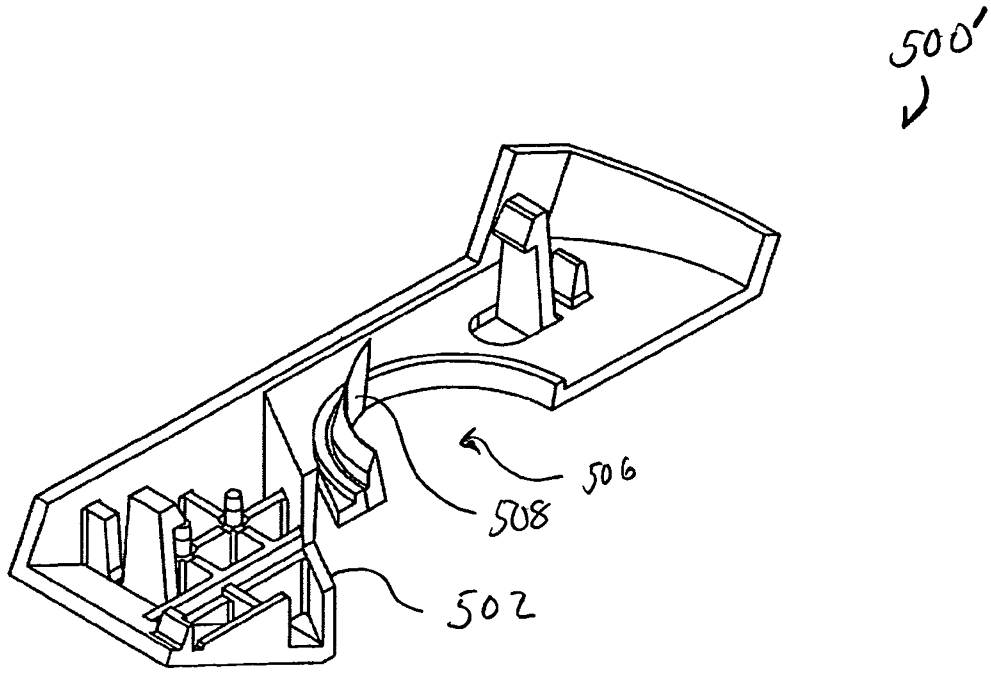

One or more automated dispensing systems 302 incorporating the modified vial adapter 500' as shown in FIG. 5*b* are clustered about a robotic arm 304. An end effector 306 located at the distal end of robotic arm 304 is adapted to grasp a vial 112 from a vial storage area (not shown).

Robotic arm 304, typically under computer control, moves an empty vial 112 to the discharge region (not shown) of a predetermined dispensing module 308. Because each dispensing module 308 is typically controlled by its own integral microprocessor, multiple simultaneous counting operations may be conducted independently of the movement of robotic arm 304. This provides a significant improvement in the utilization of the robotic arm 304, resulting in much higher throughput from the automated prescription filling system 300. The motion of the robotic arm 304 may be optimized, even if this results in filling prescriptions out of sequence.

In operation, a computer generates commands to both robotic arm 304 and to one or more individual pill-counting modules 308. Counting modules 308 may independently and simultaneously count several different prescriptions. Robotic arm 304 need only fetch a labeled vial 112, move to the discharge chute of the proper counting module 308, discharge the previously-counted tablets into the vial 112, and move the filled vial 112 to an output area where the filled vial 112 is typically placed onto an output conveyor. As with the prior art systems of FIGS. 1 and 2, the filled vials are typically moved to a pharmacist for inspection and capping.

Several novel features are incorporated in the control software, not shown, for dispensing modules 308 and robotic arm 304. Prior to fetching a vial, a vial size determination is made. Again contrasting human operation and robotic operation, when a human presents a vial 112 at the output region of dispenser module 308, he or she immediately knows if the counted contents at dispensing module 308 fit into the vial 112 presented. When the contents may potentially overflow the vial 112 presented, the operation may be aborted and a larger vial procured. However, in a robotic system, if an incorrect vial 112 is selected and presented for filling, the contents may overflow the vial 112 and be lost. As the overflow may go undetected, not only is product lost, but a customer may receive fewer pills, tablets, or capsules than were ordered and for which he or she paid.

In the system of the present invention, a vial size calculation must be made before a vial 112 is presented to ensure that the presented vial 112 will, indeed, accommodate the counted pills in the output buffer of dispensing module 308. This allows the automated system to compensate when the calculation shows that the contents of the output buffer may not fit into the vial scheduled for presentation.

Another novel feature of the control software is that a degree of fullness factor may also be calculated for each vial 112 to be transported. Nearly empty vials 112 may be accelerated to and transported at higher velocities than nearly full vials 112. Acceleration and travel velocity may, therefore, be optimized for each vial 112 based on the contents thereof.

As previously mentioned, dispenser modules 308 are typically grouped on shelves, trays or drawers that may be rearwardly withdrawn so that one or more of the dispensing modules disposed thereupon may be replenished. Were a human operator to present a vial 112 for filling at a dispensing module disposed on a withdrawn shelf, he or she would immediately notice that the desired dispensing module 308 is not physically accessible. The robotic arm 304 has no way of making this determination. Consequently, the controller software includes provisions for placing "on hold" directives to the robotic arm 304 to pick up counted tablets from an unavailable dispenser module 308. Robotic arm 304 may proceed to service other available dispensing modules 308 while waiting for the withdrawn tray of dispensing modules 308 to again become available. It should be noted, however, that all working dispensing modules 308 on the withdrawn tray may continue to independently count pills while the tray is withdrawn to replenish one or more of the other dispensing modules 308 disposed thereupon.

The novel controller software also handles a circumstance where a dispenser module's 308 contents are exhausted before a full count is placed in its output buffer. The order may be placed on hold pending replenishment of the empty dispensing module 308. Upon replenishment of the empty dispensing module 308, counting continues and the controller eventually directs robotic arm 304 to retrieve the counted pills therefrom.

Yet another circumstance handled by the controller software concerns prescription orders cancelled after pills have already been counted by a dispensing module 308. When this circumstance occurs in a human-serviced automated dispensing system, the human simply may fill a vial 112, and mark the label with "return to stock" or a similar indication. The vial 112 is then set aside for handling in accordance with the particular policy or procedure in place at a particular site. The novel controller software includes features which allow a vial to be automatically labeled "return to stock", etc., the pills picked up from the dispensing module 308, and the vial transported to an exceptions area for manual handling.

These features, typically unnecessary for human operation of an automated pharmacy dispensing system, are desirable to ensure a smooth flow of prescriptions through the inventive automated system employing robotic arm 304.

Figure 4A:
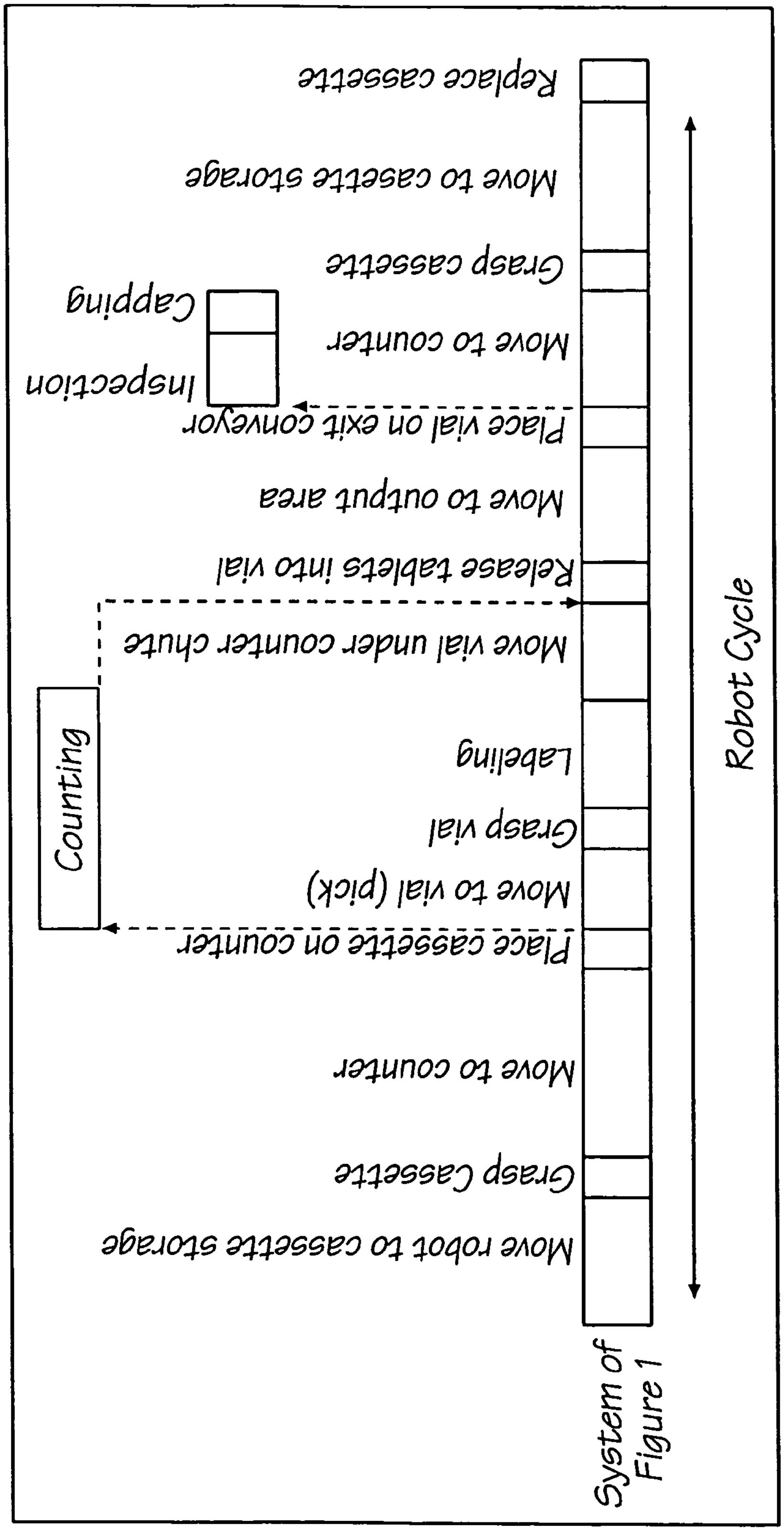
Prior Art Figure4a
FIG. 4*a* is a timing diagram of the robotic arm implementation of FIG. 1.
Figure 4B:
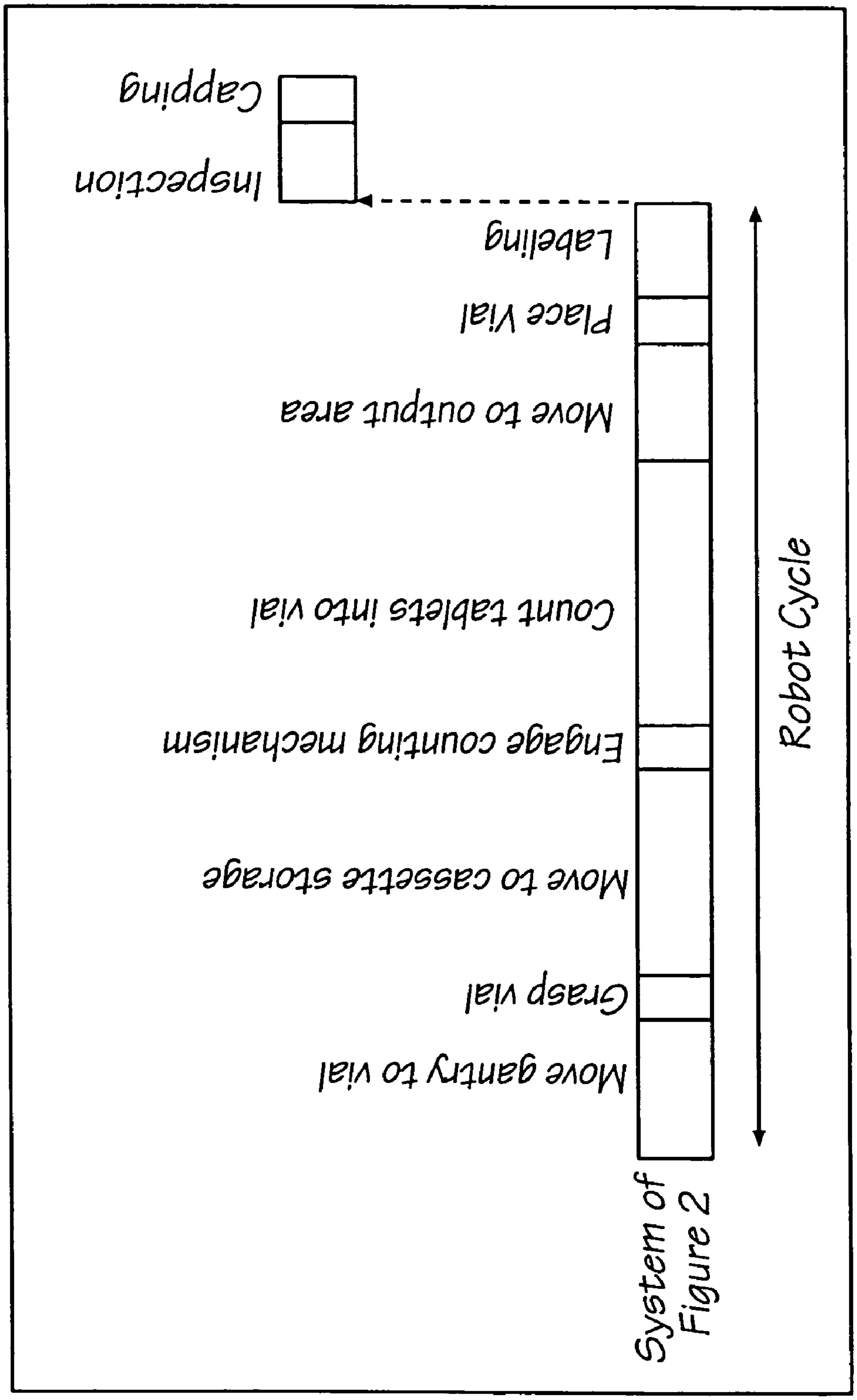
Prior Art Figure4b
FIG. 4*b* is a timing diagram of the robotic arm implementation of FIG. 2.
Figure 4C:
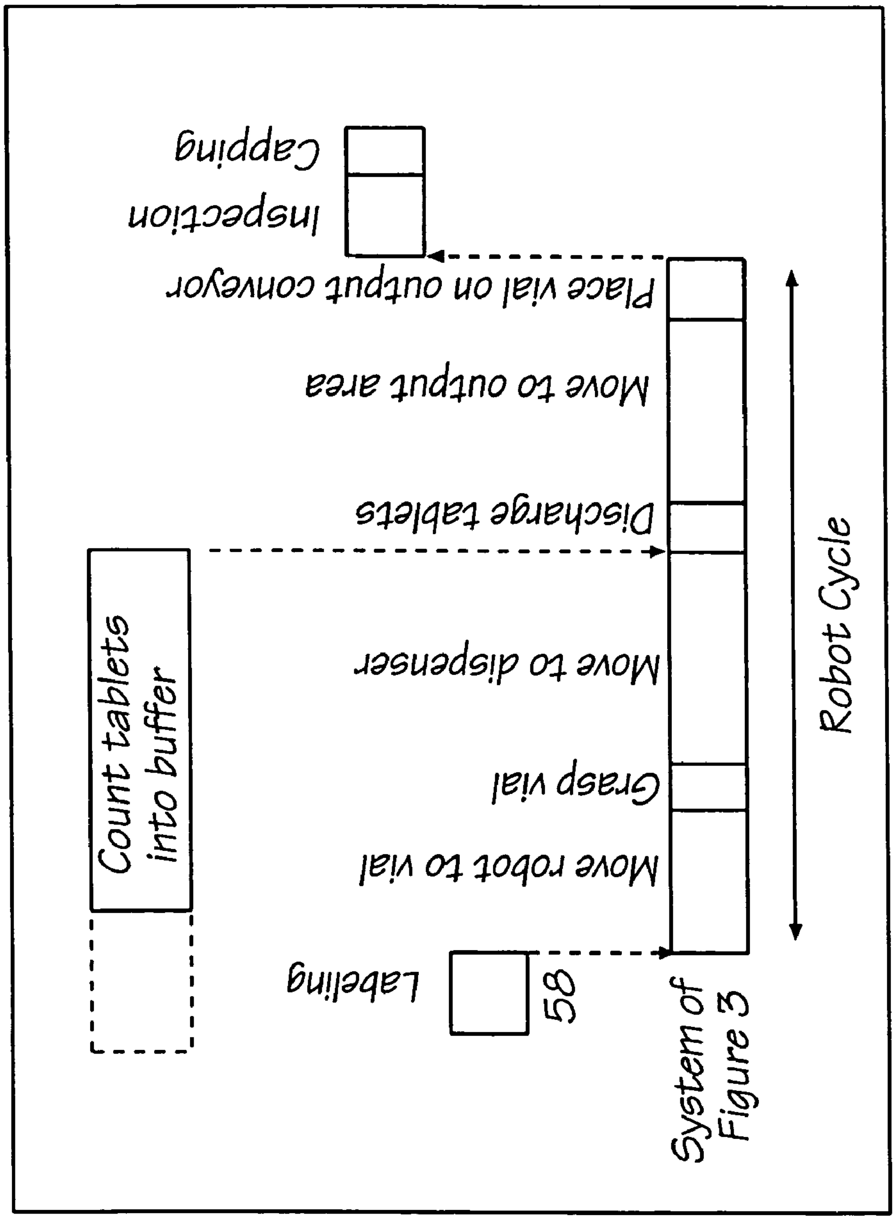
FIG. 4*c* is a timing diagram of the inventive robotic arm implementation.

Referring now to FIGS. 4*a*, 4*b* and 4*c*, there are shown graphic representations of the steps performed by the robotic arms or equivalent mechanisms in each of the embodiments shown in FIGS. 1, 2 and 3, respectively. As may been seen in FIG. 4*a*, approximately fifteen steps are required by robotic arm 102 to fill a single prescription. FIG. 4*b* shows that only about eight movements are required by the gantry mechanism of the prior art system of FIG. 2. As was previously stated, the embodiment of FIG. 2 typically operates more quickly than does the embodiment of FIG. 1. This is illustrated graphically in the relative lengths of the time lines of FIGS. 4*a* and 4*b*.

Referring now to FIG. 4*c*, there is shown an equivalent time line for the system of the present invention. Here, only approximately six movements of robotic arm 302 are required. While this is faster than the prior art gantry implementation, additional system speed may be achieved because of the independent intelligence contained in the individual counting mechanisms. Because counting may be performed in multiple counting units simultaneously, substantially independently of the movement of robotic arm 302, additional system throughput may be obtained by optimizing robotic arm 302 travel while simultaneously processing multiple prescriptions.

Since other modifications and changes varied to fit particular operating requirements and environments will be apparent to those skilled in the art, the invention is not considered limited to the examples chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. An automated prescription filling and pill dispensing cabinet system, comprising:

a) at least one automated pharmaceutical dispenser comprising a plurality of individual, independently operable pill-counting mechanisms each having its own storage of medications disposed in groups upon a plurality of movable shelves, each of said pill-counting mechanisms containing a supply of a predetermined pill and each having an output buffer adapted to receive and temporarily retain counted pills therefrom, said output buffer comprising an output area adapted to removably receive a vial presented thereat by an effector of a robotic mechanism and to discharge said temporarily retained pills into said vial;

b) a robotic mechanism located proximate said at least one automated pharmaceutical pill dispensing cabinet and having an effector adapted to grasp a vial;

c) a plurality of microprocessors for respectively controlling said plurality of individual, independent pill-counting mechanisms and said robotic mechanism connected thereto, comprising means for at least one of:

i) calculating a size of a vial necessary to contain said temporarily retained pills;

ii) varying a velocity of said robotic mechanism based upon at least the fullness of a vial;

iii) preventing access to any of said group of pill-counting mechanisms disposed upon one of said movable shelves when said one movable shelf is withdrawn;

iv) collecting said temporarily retained pills from said output buffer when an order therefore is cancelled after said pills have been counted from said supply into said output buffer;

v) suspending an order when said counting of said pills from said supply into said output buffer is interrupted because said supply of pills is exhausted prior to completion of counting; and d) an automated prescription filling system wherein at least one of said plurality of individual, independently operable pill-counting mechanisms comprises a microprocessor.

2. The automated prescription filling system as recited in claim 1, wherein at least two of said plurality of individual, independently pill-counting mechanisms may operate substantially simultaneously.

3. The automated prescription system as recited in claim 1, wherein said robotic mechanism is adapted to receive an empty vial at a vial storage area, to transport said empty vial to said output region of said output buffer, and, after receiving said temporarily retained pills therefrom in said empty vial, to transport the resulting filled vial to an output area.

4. The automated prescription system as recited in claim 3, wherein said robotic mechanism is further adapted to transport at least one of said empty vial, and said filled vial to a vial labeling station.

5. The automated prescription system as recited in claim 3, wherein said empty vial is a labeled empty vial.

6. The automated prescription system as recited in claim 5, wherein said labeling station comprises at least one of the types: manual labeling station and automated labeling station.

7. The automated prescription system as recited in claim 6, wherein said robotic mechanism is located proximate a front side of said automatic pharmaceutical dispenser.

8. The automated prescription system as recited in claim 7, wherein each of said plurality of individual, independent pill-counting mechanisms may be replenished from a side other than said front side of said automatic pharmaceutical dispenser.

9. The automated prescription system as recited in claim 7, wherein each of said plurality of individual, independent pill-counting mechanisms may be serviced from a side other than said front side of said automatic pharmaceutical dispenser.

10. A method for utilizing a robotic mechanism in an automated prescription filling system, the steps comprising:

a) providing an automatic pharmaceutical dispensing system comprising a plurality of individual, independently operable pill-counting mechanisms disposed in groups upon a plurality of movable shelves, each of said pill counting mechanisms containing a supply of a predetermined pill and each having an output buffer adapted to receive and temporarily retain counted pills therefrom, independent of the presence of a vial, said output buffer comprising an output area adapted to removably receive vial presented thereat by an effector of a three dimensional robotic arm, and, upon command, to discharge said counted pills into said vial;

b) providing a robotic mechanism located proximate said automatic pharmaceutical dispensing system, said robotic mechanism having a controller associated therewith and an effector at a distal end thereof, said effector being adapted to grasp a vial;

c) providing an independent microprocessor operatively connected to each respective pill-counting mechanism for the control thereof, said plurality of independent microprocessors comprising at least one of:

i) means for calculating a size of a vial necessary to contain said temporarily retained pills;

ii) means for varying a velocity of said robotic mechanism based upon at least the fullness of a vial;

iii) means for preventing access by said robotic mechanism to any of said group of pill-counting mechanisms disposed upon one of said movable shelves when said one movable shelf is withdrawn;

iv) means for collecting said temporarily retained pills from said output buffer when an order therefore is cancelled after said pills have been counted from said supply into said output buffer; and v) means for suspending an order when said counting of said pills from said supply into said output buffer is interrupted because said supply of pills is exhausted prior to completion of counting;

d) issuing a command to a predetermined one of said plurality of pill counting mechanisms to count a predetermined number of pills into said output buffer;

e) moving said robotic mechanism in response to a command from said means for controlling to fetch a vial and to move said vial to said output region of said predetermined one of said plurality of pill-counting mechanisms;

f) discharging said counted pills from said output buffer into said vial; and g) moving said robotic mechanism and said vial containing said discharged pills to an output station.

11. The method for utilizing a robotic mechanism in an automated prescription filling system as recited in claim 10, the steps further comprising:

i) when required, using said robotic mechanism to move said vial to a labeling station.

12. The method for utilizing a robotic mechanism in an automated prescription filling system as recited in claim 11, wherein said labeling station comprises at least one of the types: manual labeling station and automated labeling station.

13. The method for utilizing a robotic mechanism in an automated prescription filling system as recited in claim 10, wherein at least two of said plurality of individual, independent pill-counting mechanisms may operate substantially simultaneously.

14. The method for utilizing a robotic mechanism in an automated prescription filling system as recited in claim 10, wherein said robotic mechanism is located proximate a front side of said automatic pharmaceutical dispenser.

15. The method for utilizing a robotic mechanism in an automated prescription filling system as recited in claim 14, wherein each of said plurality of individual, independent pill-counting mechanisms may be replenished from a side opposite said front side of said automatic pharmaceutical dispenser.

16. The method for utilizing a robotic mechanism in an automated prescription filling system as recited in claim 14, wherein each of said plurality of individual, independent pill-counting mechanisms may be serviced from a side opposite said front side of said automatic pharmaceutical dispenser.

* * * * *